US012602328B2

(12) United States Patent
Kim et al.

(10) Patent No.: US 12,602,328 B2
(45) Date of Patent: Apr. 14, 2026

(54) MEMORY DEVICE, SYSTEM INCLUDING THE SAME, AND OPERATING METHOD OF MEMORY DEVICE

(71) Applicant: SAMSUNG ELECTRONICS CO., LTD., Suwon-si (KR)

(72) Inventors: Daehyun Kim, Suwon-si (KR); Seongmuk Kang, Suwon-si (KR); Jiho Kim, Suwon-si (KR); Kyomin Sohn, Suwon-si (KR); Yeonggeol Song, Suwon-si (KR); Kijun Lee, Suwon-si (KR); Myungkyu Lee, Suwon-si (KR); Sukhan Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 29 days.

(21) Appl. No.: 18/416,558

(22) Filed: Jan. 18, 2024

(65) Prior Publication Data

US 2024/0248850 A1     Jul. 25, 2024

(30) Foreign Application Priority Data

Jan. 19, 2023    (KR) ........................ 10-2023-0008111

(51) Int. Cl.
*G06F 12/08* (2016.01)
*G06F 12/0891* (2016.01)
(Continued)

(52) U.S. Cl.
CPC ........ *G06F 12/0891* (2013.01); *G06F 12/126* (2013.01)

(58) Field of Classification Search
CPC ............... G06F 12/0891; G06F 12/126; G06F 11/1048; G06F 2212/1024; G06F 2212/403; G06F 12/0888; G06F 2212/1032; G06F 3/0611; G06F 3/0656; G06F 3/0658; G06F 3/0659; G06F 3/0679; G06F 12/0868;
(Continued)

(56) References Cited

U.S. PATENT DOCUMENTS 11,093,323 B2     8/2021   Pandey et al.
11,265,016 B2     3/2022   Palangappa
(Continued)

FOREIGN PATENT DOCUMENTS

KR      10-2022-0067992        5/2022

*Primary Examiner* — Masud K Khan
(74) *Attorney, Agent, or Firm* — Morgan, Lewis & Bockius LLP

(57)        ABSTRACT

A memory system includes a system controller and a memory device. The system controller includes a memory controller configured to transmit a received address to a decoding module, and output, to the host device, decoded data. The decoding module includes a cache device and a decoder. The decoding module is configured to receive the data corresponding to the address from the memory device. The decoding module is configured transmit the data stored in the cache device to the memory controller in response to determining that the data corresponding to the address is stored in the cache device. The decoding module is configured to decode the data corresponding to the address to generate decoded data and store the decoded result in the cache device in response to determining that the data corresponding to the address is not stored in the cache device.

20 Claims, 11 Drawing Sheets

(51) Int. Cl.
    *G06F 12/12*        (2016.01)
    *G06F 12/126*     (2016.01)

(58) Field of Classification Search
    CPC .. G06F 13/1668; G06F 3/0604; G06F 3/0614;
                  G06F 12/0802; G06F 2212/1016
    See application file for complete search history.

(56) References Cited

U.S. PATENT DOCUMENTS

| | | | |
|---|---|---|---|
| 11,416,431 B2 | 8/2022 | Malladi et al. | |
| 2017/0139850 A1* | 5/2017 | Yoon | G06F 15/167 |
| 2020/0004628 A1* | 1/2020 | Ben-Rubi | H03M 13/1111 |
| 2021/0334098 A1* | 10/2021 | Scrbak | G06F 9/3808 |
| 2021/0399744 A1 | 12/2021 | Kwok | |
| 2022/0021403 A1 | 1/2022 | Fu et al. | |
| 2022/0050741 A1* | 2/2022 | Lee | G06F 11/1004 |
| 2022/0156146 A1 | 5/2022 | Choe et al. | |
| 2022/0179736 A1 | 6/2022 | Sforzin et al. | |
| 2022/0229723 A1 | 7/2022 | Fryman et al. | |

* cited by examiner

MEMORY DEVICE, SYSTEM INCLUDING THE SAME, AND OPERATING METHOD OF MEMORY DEVICE

CROSS-REFERENCE TO RELATED APPLICATION

This U.S. patent application claims priority under 35 U.S.C. § 119 to Korean Patent Application No. 10-2023-0008111, filed on Jan. 19, 2023, in the Korean Intellectual Property Office, the disclosure of which is incorporated by reference in its entirety herein.

1. Technical Field

The inventive concept relates to a memory system, and more particularly, to a memory device for performing cache management on the basis of a decoding latency, a system including the same, and an operating method of the memory device.

2. Discussion of Related Art

Apparatuses configured to process data may perform various operations by accessing memories. For example, the apparatuses may process data read from the memories or may write processed data to the memories. Due to performance and functions demanded for systems, the systems may include various types of apparatuses that communicate with one another via links that provide high bandwidths and low latency. A memory included in a system may be shared and accessed by two or more apparatuses. Accordingly, the performance of the system may depend not only on operation speeds of respective apparatuses but also on communication efficiency between the apparatuses and the time taken for accessing memories.

Some of the data may be stored in a cache to increase the performance of the system. A cache is a component that stores data so that future requests for that data can be served faster. However, since the cache has a limited size and it is difficult to predict the future requests, data for an imminent future request may be inadvertently evicted from the cache system, thereby reducing the performance of the system.

SUMMARY

At least one embodiment of the inventive concept provides a memory device for performing cache management on the basis of a decoding latency, a system including the memory device, and an operating method of the memory device.

According to an aspect of the inventive concept, there is provided a memory system including a system controller communicating with a host device, and a memory device configured to transmit data corresponding to an address to the system controller, on the basis of the address and a data read command received from the system controller. The system controller includes a memory controller configured to receive the address from the host device, transmit the received address to a decoding module, and output, to the host device, decoded data received from the decoding module. The decoding module includes a cache device and a decoder. The decoding module is configured: to receive the data corresponding to the address from the memory device; transmit the data stored in the cache device to the memory controller in response to determining that the data corresponding to the address is stored in the cache device; decode the data corresponding to the address received from the memory device by using the decoder to generate decoded data, store the decoded data in the cache device, and transmit the decoded data to the memory controller in response to determining that the data corresponding to the address is not stored in the cache device.

According to an aspect of the inventive concept, there is provided a decoding module including a cache device and a decoder. The decoder is configured to: determine whether or not data corresponding to an address received from a memory controller is stored in the cache device; transmit the data stored in the cache device to the memory controller in response to determining that the data corresponding to the address is stored in the cache device; and receive the data corresponding to the address by transmitting the address to the memory device, decode the data corresponding to the address by using the decoder to generated decoded data, store the decoded data in the cache device, and transmit the decoded data to the memory controller in response to determining that the data corresponding to the address is not stored in the cache device.

According to an aspect of the inventive concept, there is provided a method for performing cache management in a memory system. The method includes: a decoding module receiving an address from a host device; determining whether or not data corresponding to the address is stored in a cache device included in the decoding module; transmitting the data stored in the cache device to the memory controller, in response to determining the data corresponding to the address is not stored in the cache device; decoding the data corresponding to the address received from the memory device, by using a decoder to generate decoded data, storing the decoded data in the cache device, and transmitting the decoded data to the memory controller in response to determining the data corresponding to the address is not stored in the cache device.

BRIEF DESCRIPTION OF THE DRAWINGS

Embodiments will be more clearly understood from the following detailed description taken in conjunction with the accompanying drawings in which.

DETAILED DESCRIPTION OF THE EMBODIMENTS

Hereinafter, embodiments will be described in detail with reference to the accompanying drawings.

Figure 1:
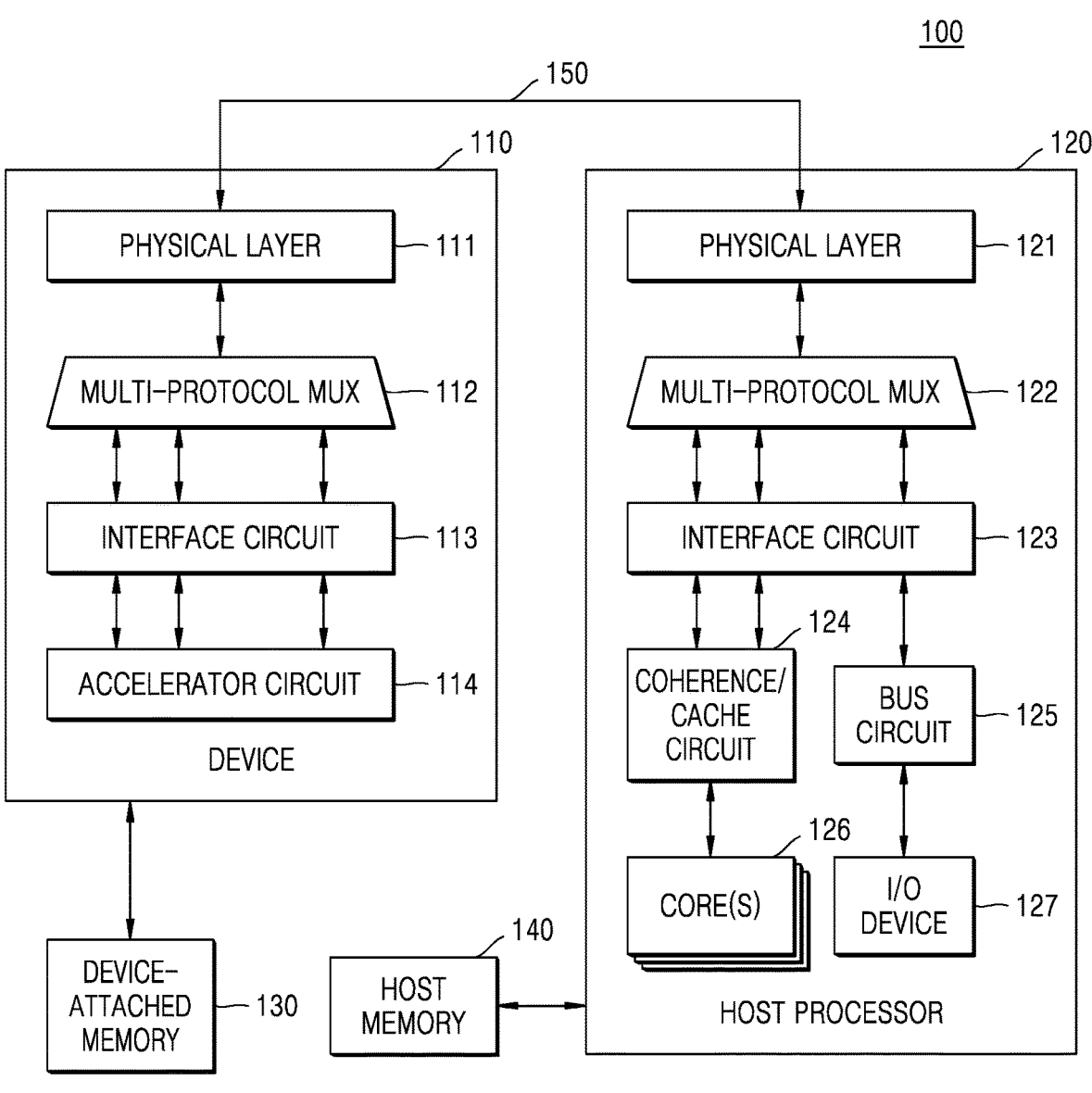
FIG. 1 is a block diagram illustrating a system according to an embodiment.

FIG. 1 is a block diagram illustrating a system 100 according to an embodiment.

Referring to FIG. 1, the system 100 may be any computing system (or a component included in the computing system) including a device 110 and a host processor 120 that communicate with each other. For example, the system 100 may be included in a stationary computing system, such as a desktop computer, a server, or a kiosk, or may be included in a portable computing system, such as a laptop computer, a mobile phone, or a wearable device. In addition, in some embodiments, the system 100 may be included in a system-on-chip (SoC) or system-in-package (SiP), in which the device 110 and the host processor 120 are implemented in a single chip or package. As illustrated in FIG. 1, the system 100 may include the device 110, the host processor 120, a device-attached memory 130, and a host memory 140. According to an embodiment, the system 100 does not include the device-attached memory 130. Referring to FIG. 1, the device 110 and the host processor 120 may communicate with each other via a link 150 and may transmit or receive a message and/or data to or from each other over the link 150.

Embodiments will be described by referring to the link 150 based on compute express link (CXL) specifications that support CXL protocols as a non-limiting example. However, the embodiments are not limited thereto. For example, the device 110 and the host processor 120 may communicate with each other on the basis of coherent interconnect technologies, such as an XBus protocol, an NVLink protocol, an Infinity Fabric protocol, a cache coherent interconnect for accelerators (CCIX) protocol, and a coherent accelerator processor interface (CAPI).

In some embodiments, the link 150 may support multiple protocols, and messages and/or data may be transmitted through the multiple protocols. For example, the link 150 may support CXL protocols including a non-coherent protocol (e.g., CXL.io), a coherent protocol (e.g., CXL.cache), and a memory access protocol (or a memory protocol) (e.g., CXL.mem). In some embodiments, as a non-limiting example, the link 150 may support a protocol such as peripheral component interconnect (PCI), PCI express (PCIe), universal serial bus (USB), or serial advanced technology attachment (SATA). As used herein, the protocol supported by the link 150 may be referred to as an interconnect protocol.

The device 110 may refer to any device that provides a useful function to the host processor 120. In some embodiments, referring to the CXL specification 2.0, the device 110 may correspond to an accelerator supporting CXL specification. For example, software running on the host processor 120 may offload at least a portion of computing and/or input/output (I/O) tasks to the device 110. In some embodiments, the device 110 may include at least one of a programmable component such as a graphics processing unit (GPU) or a neural processing unit (NPU), a component for providing a fixed function, such as an intellectual property (IP) core, and a reconfigurable component such as a field programmable gate array (FPGA). As illustrated in FIG. 1, the device 110 may include a physical layer 111, a multi-protocol multiplexer 112, an interface circuit 113, and an accelerator circuit 114 and may communicate with the device-attached memory 130.

The accelerator circuit 114 may perform a useful function provided to the host processor 120 by the device 110 and may also be referred to as accelerator logic. As illustrated in FIG. 1, when the device-attached memory 130 is included in the system 100, the accelerator circuit 114 may communicate with the device-attached memory 130 on the basis of a protocol independent of the link 150, i.e., a device-specific protocol. In addition, as illustrated in FIG. 1, the accelerator circuit 114 may communicate with the host processor 120 via the interface circuit 113 by using multiple protocols.

The interface circuit 113 may determine one protocol from among the multiple protocols on the basis of a message and/or data for communication between the accelerator circuit 114 and the host processor 120. The interface circuit 113 may be connected to at least one protocol queue included in the multi-protocol multiplexer 112, and may exchange a message and/or data with the host processor 120 via the at least one protocol queue. In some embodiments, the interface circuit 113 and the multi-protocol multiplexer 112 may be integrated into a single component. In some embodiments, the multi-protocol multiplexer 112 may include multiple protocol queues respectively corresponding to the multiple protocols supported by the link 150. In addition, in some embodiments, the multi-protocol multiplexer 112 may arbitrate between communications by different protocols and may provide selected communications to the physical layer 111. In some embodiments, the physical layer 111 may be connected to a physical layer 121 of the host processor 120 via a single interconnect, bus, trace, or the like.

The host processor 120 may be a main processor of the system 100, for example, may be a central processing unit (CPU), and in some embodiments, may correspond to a host processor (or a host) with the CXL specification. As illustrated in FIG. 1, the host processor 120 may be connected to the host memory 140 and may include the physical layer 121, a multi-protocol multiplexer 122, an interface circuit 123, a coherence/cache circuit 124, a bus circuit 125, at least one core 126, and an I/O device 127.

The at least one core 126 may execute an instruction and may be connected to the coherence/cache circuit 124. The at least one core 126 may provide a request corresponding to the instruction to the device 110 via the interface circuit 123. The coherence/cache circuit 124 may include a cache hierarchy and may be referred to as coherence/cache logic. As illustrated in FIG. 1, the coherence/cache circuit 124 may communicate with the at least one core 126 and the interface circuit 123. For example, the coherence/cache circuit 124 may enable communication via two or more protocols including a coherent protocol and a memory access protocol. In an embodiment, the coherence/cache circuit 124 includes a direct memory access (DMA) circuit. The coherence/cache circuit 124 may generate a request and response to maintain cache coherence between the device-attached memory 130 and the host memory 140 and may provide the request and response to the device 110 via the interface circuit 123. The I/O device 127 may be used to communicate with the bus circuit 125. For example, the bus circuit 125 may be peripheral component interconnect express (PCIe) logic and the I/O device 127 may be a PCIe I/O device.

The interface circuit 123 may enable communication between the components of the host processor 120, e.g., the coherence/cache circuit 124 and the bus circuit 125, and the device 110. In some embodiments, the interface circuit 123 may enable exchange of messages and/or data between the components of the host processor 120 and the device 110, according to multiple protocols, e.g., a non-coherent protocol, a coherent protocol, and a memory protocol. For example, the interface circuit 123 may determine one protocol from among the multiple protocols on the basis of a message and/or data for communication between the components of the host processor 120 and the device 110.

The multi-protocol multiplexer 122 may include at least one protocol queue. The interface circuit 123 may be connected to the at least one protocol queue and may exchange the message and/or data with the device 110 via the at least one protocol queue. In some embodiments, the interface circuit 123 and the multi-protocol multiplexer 122 may be integrated into one component. In some embodiments, the multi-protocol multiplexer 122 may include multiple protocol queues respectively corresponding to the multiple protocols supported by the link 150. In addition, in some embodiments, the multi-protocol multiplexer 122 may arbitrate between communications by different protocols and provide selected communications to the physical layer 121.

Figure 2:
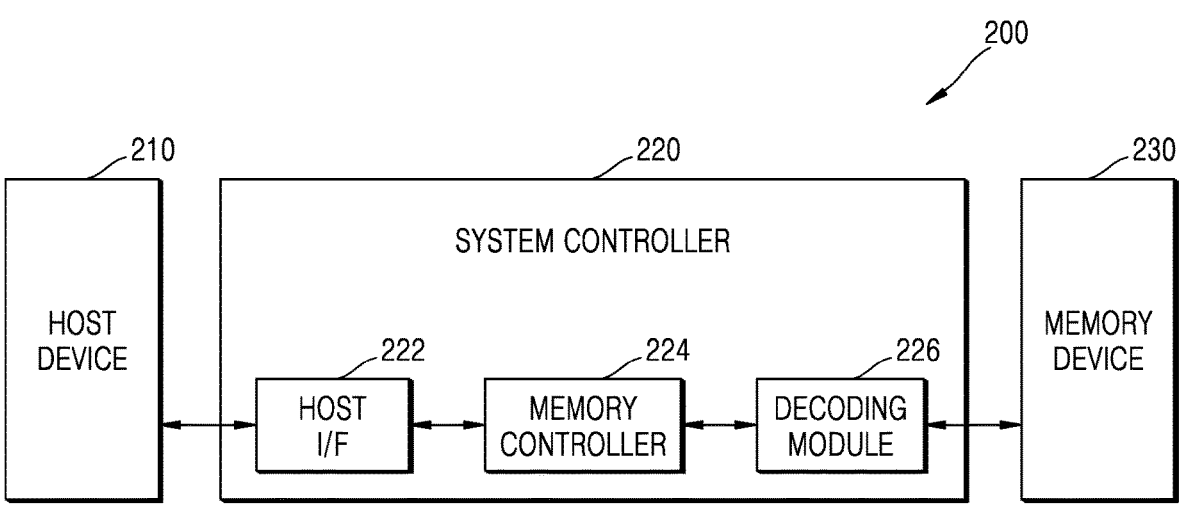
FIG. 2 is a block diagram illustrating a memory system according to an embodiment.

FIG. 2 is a block diagram illustrating a memory system according to an embodiment.

Referring to FIG. 2, a memory system 200 may include a host device 210, a system controller 220, and a memory device 230 (e.g., dynamic random access memory (DRAM)). According to an embodiment, the host device 210 corresponds to the host processor 120 of FIG. 1. The host device 210 may transmit, to the system controller 220, an address in which data is stored, to read the corresponding data stored in the memory device 230. The system controller 220 may transmit, to the memory device 230, a command to read the data stored in the address, and the memory device 230 may read the data stored in the corresponding address based on the command and transmit the read data to the host device 210 through the system controller 220.

The system controller 220 may include a host interface 222 (e.g., an interface circuit), a memory controller 224 (e.g., a controller circuit), and a decoding module 226 (e.g., a decoding circuit). The host interface 222 may determine one protocol from among multiple protocols on the basis of a message and/or data for communication between the host device 210 and the system controller 220. The memory controller 224 may acquire an address from the host device 210 via the host interface 222 and may transmit a data read command and the acquired address to the memory device 230. The memory device 230 may transmit data stored in the received address to the decoding module 226, in response to the data read command. The decoding module 226 may decode the data received from the memory device 230 to generate decoded data and transmit the decoded data to the memory controller 224. The decoding module 226 may correct an error included in the data by using various error correction algorithms. For example, the memory device 230 may correspond to the device attached memory 130.

The data received by the decoding module 226 may include an error. The memory device 230 may include a plurality of rows (e.g., 4,096 rows), and at least some of the plurality of rows may be physically damaged. When the host device 210 reads data stored in a physically damaged row address, an error may be included in the read data. For example, data, which is stored in a row that is damaged, is deformed due to a physical impact, or includes noise, may include an error when being read. Accordingly, the system controller 220 may perform an operation of correcting the error in the read data.

The decoding module 226 may perform an error correction operation on the data received from the memory device 230. For example, the decoding module 226 may perform an error correction operation by using a parity bit included in the data. Data stored by the memory device 230 may include a message bit and a parity bit. The message bit may be a bit including content that data is intended to convey, and the parity bit may be a bit coded in an algebraic dependence on the message bit and may be used to detect an error included in the message bit. For example, the decoding module 226 may identify the message bit and the parity bit of the received data and may detect, on the basis of the parity bit, whether or not the message bit includes an error. Hereinafter, the time taken for the decoding module 226 to detect the error or detect and correct the error in the data may be referred to as a decoding latency. When the time taken for a process excluding the decoding latency from a data transmission and reception process of the memory system 200 is short, the decoding latency may have a small effect on the total process execution time. However, the total process execution time may be shortened, and thus, the effect of decoding latency on the process execution time may increase. Therefore, the need for a solution capable of shortening a decoding latency has increased.

Figure 3:
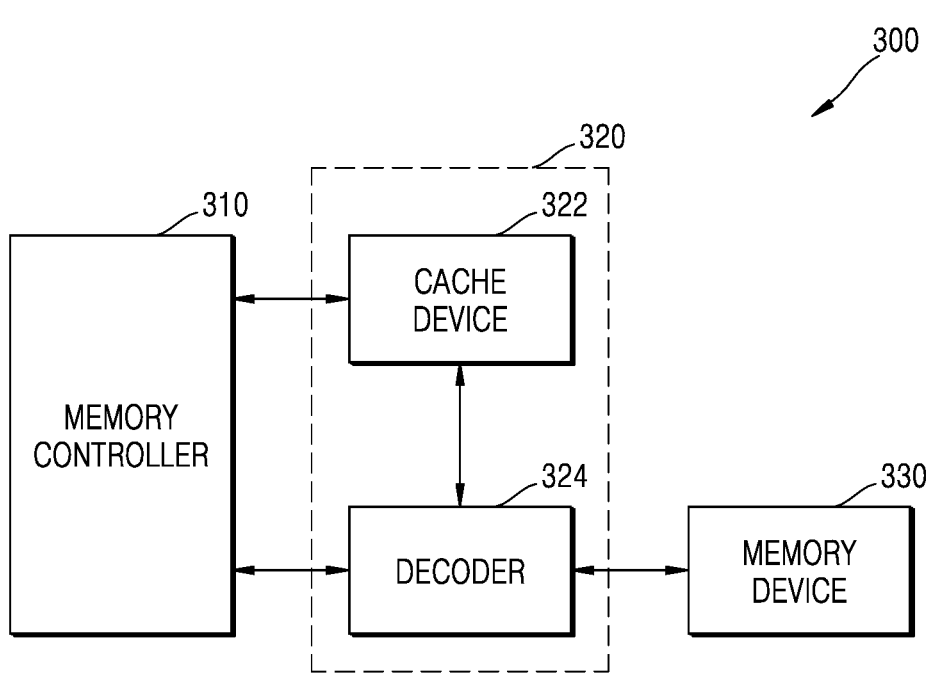
FIG. 3 is a block diagram illustrating operations of a decoder and a cache device, according to an embodiment.

FIG. 3 is a block diagram illustrating operations of a decoder and a cache device, according to an embodiment. Referring to FIG. 3, a memory system 300 may include a memory controller 310, a decoding module 320, and a memory device 330 (e.g., dynamic random access memory (DRAM)).

Referring to FIG. 3, the decoding module 320 may include a cache device 322 and a decoder 324 (e.g., a decoder circuit). The decoder 324 (e.g., an error correction code (ECC) decoder) may detect an error by decoding data acquired from a memory device 330. For example, the decoder 324 may detect the error included in the data by using a parity bit included in the acquired data. For example, the decoder 324 may determine a number of errors included in the acquired data and generate decoded data from which the errors are removed. For example, the decoding module 320 may correspond to the decoding module 226 and the memory device 330 may correspond to memory device 230.

The cache device 322 may store data on the basis of a preset criterion. The cache device 322 may map and store the number of errors included in the data read from the memory device 330 to the decoded data (error corrected data) to the cache device 322. Hereinafter, the information including the number of errors included in the read data and the decoded data may be referred to as decoding information. According to an embodiment, the cache device 322 may store decoding information of data including more errors than a preset number. For example, even when decoded data is new data that is not stored in the cache device 322, the cache device 322 does not store decoding information of the corresponding data when the number of errors included in the data is less than a preset number. When receiving a data address from the memory controller 310 and storing decoding information of data corresponding to the received address, the cache device 322 may immediately return decoded data to the memory controller 310.

According to an embodiment, the cache device 322 may include a plurality of cache devices having a hierarchical structure. For example, the cache device 322 may include a first cache device (e.g., L1 cache), a second cache device (e.g., L2 cache), and a third cache device (e.g., L3 cache). When searching the cache device 322 for data, the memory controller 310 may sequentially search the first cache device, the second cache device, and the third cache device. For example, if the memory controller 310 is unable to find the data in the first cache device, the memory controller 310 next searches for the data in the second cache device. According to an embodiment, the cache device 322 stores, in a higher cache device, decoding information having a high frequency of use from among stored decoding information. For example, decoding information stored in the first cache device may be decoding information regarding data having a higher frequency of use than decoding information stored in the second cache device. The decoding information stored in the second cache device may be decoding information regarding data having a higher frequency of use than decoding information stored in the third cache device.

In response to receiving an address from the memory controller 310, the decoding module 320 may identify whether or not decoding information of data corresponding to the received address is stored in the cache device 322. In an embodiment, when the decoding information of the data corresponding to the received address is stored in the cache device 322, the decoding module 320 returns decoded data to the memory controller 310 without transmitting a data read command to the memory device 330. When the cache device 322 does not store the decoding information of the data corresponding to the received address, the decoding module 320 may acquire the data by transmitting, to the memory device 330, a read command for data stored in the address and may decode the acquired data by using the decoder 324. The decoding module 320 may identify the number of errors included in the acquired data by using the decoder 324. After decoding has completed, the decoding module 320 may transmit, to the memory controller 310, the number of errors included in the read data and the decoded data.

The decoding module 320 may store decoding information in the cache device 322. According to an embodiment, in response to identifying that the number of errors included in read data is greater than a preset number, the decoding module 320 stores decoding information of the data in the cache device 322. In other words, when the number of errors included in the read data is less than the preset number, a decoding latency may be short, and thus, a space in which data having a longer decoding latency is to be stored needs to be secured on a cache device. For example, when the number of errors in data is less than a preset number, the decoding module 320 does not store decoding information of the corresponding data in the cache device 322.

According to an embodiment, the decoding module 320 determines whether or not a free space (e.g., unused space) remains in the cache device 322 to store decoding information in the cache device 322. When the free space remains in the cache device 322, the decoding module 320 may store decoding information of corresponding data in the cache device 322. When the free space does not remain in the cache device 322, the decoding module 320 may evict at least one of a plurality of pieces of decoding information stored in the cache device 322 and store new decoding information in the cache device 322.

The decoding module 320 may evict at least one of the plurality of pieces of decoding information according to a preset criterion. According to an embodiment, the decoding module 320 may preferentially evict decoding information of data including the smallest number of errors from among the plurality of pieces of decoding information. For example, if the preset number is 3 and the cache device 322 stores decoding information of data having 3 errors and decoding information of data having 4 errors, one or more of the decoding information of the data having 3 errors would be evicted first. The time taken for decoding data including a small number of errors may be short, and thus, the corresponding data may not have a significant effect on the time taken for decoding even when not stored in the cache device 322. In contrast, the time taken for decoding data including a large number of errors may increase, and thus, the corresponding data may help to shorten the time taken for decoding when stored in the cache device 322. According to an embodiment, when the number of errors included in data to be currently stored in the cache device 322 is the smallest, the decoding module 320 does not store, in the cache device 322, decoding information of the data to be currently stored in the cache device 322.

According to an embodiment, when a free space does not remain in the cache device 322, the decoding module 320 may collectively evict decoding information of data including a number of errors less than a preset number. For example, when the free space remains in the cache device 322, the decoding module 320 may store decoding information in the cache device 322 regardless of the number of errors included in read data. Subsequently, when the free space does not remain in the cache device 322, the decoding module 320 may secure a space in which decoding information of data including more errors is to be stored, by evicting all decoding information of data including a number of errors less than a preset number. For example, if the cache device 322 is full, stores decoding information of first data having 4 errors, second data having 4 errors, and decoding information of a plurality of data having 5 errors, the decoding information of the first data and the second data can be evicted.

Figure 4:
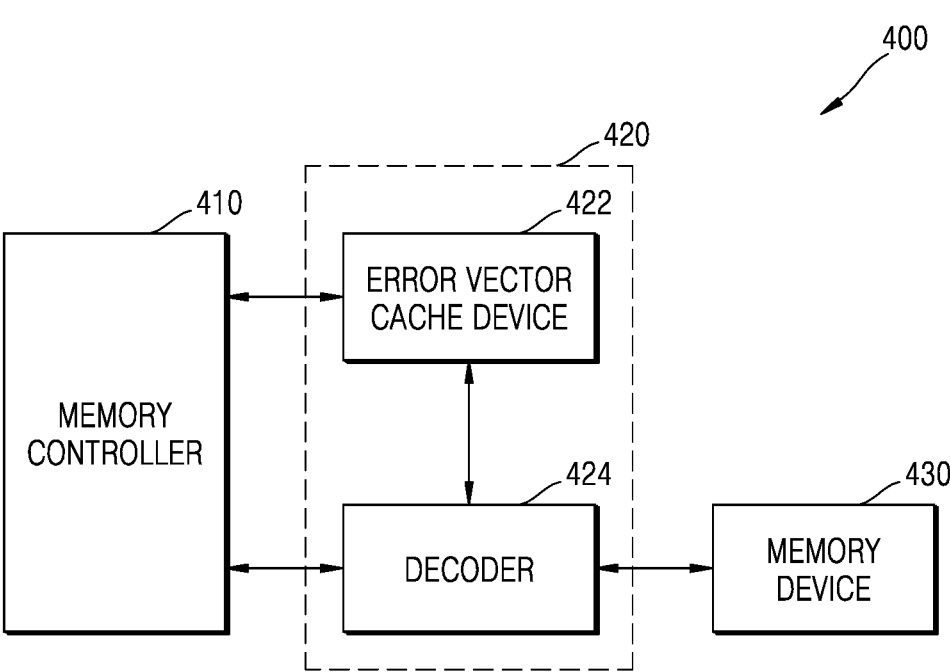
FIG. 4 is a block diagram illustrating operations of a decoder and an error vector cache device, according to an embodiment.

FIG. 4 is a block diagram illustrating operations of a decoder and an error vector cache device, according to an embodiment. The same description of FIG. 4 as the description of FIG. 3 is omitted. Referring to FIG. 4, a memory system 400 may include a memory controller 410, a decoding module 420, and a memory device 430 (e.g., dynamic random access memory (DRAM)). The decoding module 420 may correspond to the decoding module 226. The memory device 430 may correspond to the memory device 230.

Referring to FIG. 4, the decoding module 420 may include an error vector cache device 422. The decoding module 420 may generate an error vector on the basis of the result of decoding data read from a memory device 430. In an embodiment, the error vector is a vector obtained by encoding a position of an error included in the read data. For example, when only a first bit of the read data has an error, the error vector may be a vector in which only a first bit is 1 and the remaining bits are 0. The error vector may indicate positions of bits having errors. The error vector cache device 422 may store the error vector of the read data instead of the decoded data. Hereinafter, the error vector of the read data and the number of errors included in the read data, which are stored in the error vector cache device 422, may be referred to as encoded decoding information.

When receiving an address from a memory controller 410, the decoding module 420 may determine whether or not encoded decoding information corresponding to the address is present in the error vector cache device 422. When the encoded decoding information corresponding to the address is present in the error vector cache device 422, the decoding module 420 may restore data from the encoded decoding information by applying a preset decoding algorithm and transmit the restored data to the memory controller 410. According to an embodiment, the decoding module 420 restores the data from the encoded decoding information by using erasure decoding. In contrast, when the encoded decoding information corresponding to the address is not present in the error vector cache device 422, the decoding module 420 may transmit, to the memory device 430, a read command for data corresponding to the address. The decoding module 420 may then decode data acquired from the memory device 430 to generate decoded data and may transmit the decoded data to the memory controller 410.

According to an embodiment, when data is restored by using erasure decoding, the maximum number of errors, which may be corrected by a decoder 424, may increase. For example, when the maximum number of errors, which may be corrected by the decoding module 320 via decoding as described with reference to FIG. 3, is N, the maximum number of errors, which may be corrected by the decoder 424 by using erasure decoding, may be N+m (wherein m is an integer greater than or equal to 1) as described with reference to FIG. 4.

According to an embodiment, the decoding module 420 performs a syndrome check after restoring data from encoded decoding information by using a preset algorithm. The decoding module 420 may determine the number of errors included in data by performing the syndrome check. The performance time of the syndrome check may be short enough not to significantly affect the total decoding time.

Figure 5A:
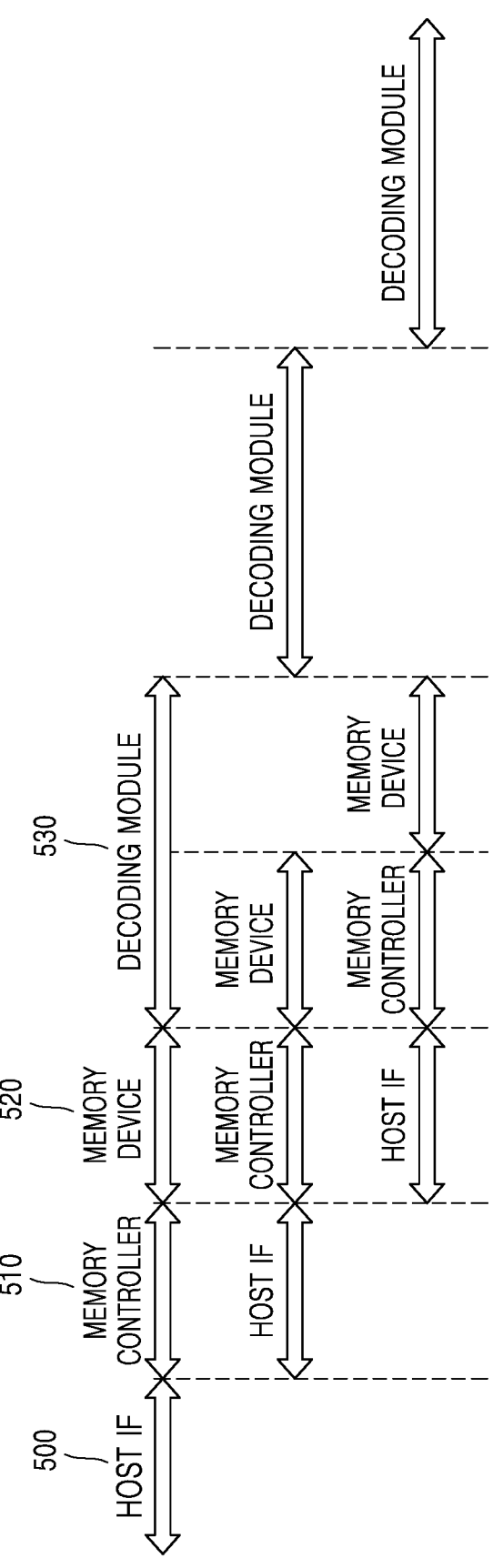
FIGS. 5A and 5B are timing diagrams illustrating a decoding operation of a memory system, according to an embodiment.
Figure 5B:
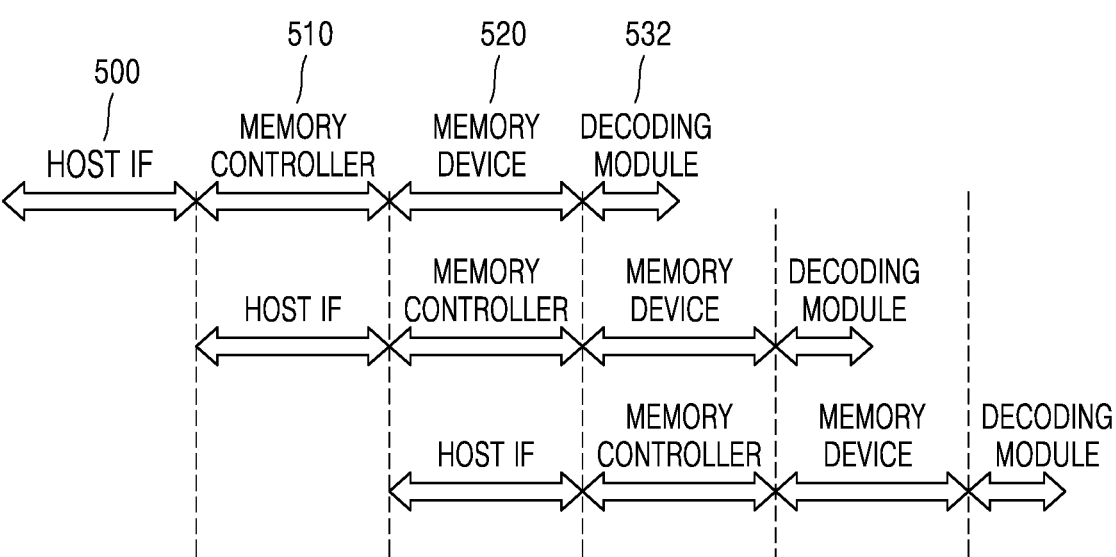

FIGS. 5A and 5B are timing diagrams illustrating a decoding operation of a memory system, according to an embodiment.

FIG. 5A is a timing diagram schematically illustrating the time taken for each operation of a decoding process. Referring to FIG. 5A, a host may sequentially transmit a plurality of addresses to a system processor. A host interface 500 may identify a protocol of a received signal and transmit the identified protocol to a memory controller 510. For example, the host interface 500 may communicate with the memory controller 510 using the identified protocol. The memory controller 510 may transmit, to a memory device 520, a read command for data stored in the sequentially received addresses. The memory device 520 may transmit, on the basis of the received read command and addresses, some of the stored data to a decoding module 530. The decoding module 530 may decode the data received from the memory device 520 to generate decoded data and transmit the decoded data to the memory controller 510.

As illustrated in FIG. 5A, the time for which the host interface 500, the memory controller 510, and the memory device 520 operate may be short in the decoding process, and thus, the decoding process may be delayed according to an operation speed of the decoding module 530. Accordingly, when the operation speed of the decoding module 530 is increased, an operation speed of the decoding process may be increased.

FIG. 5B is a timing diagram schematically illustrating the time taken for each operation of a decoding process using an decoding module, according to an embodiment. Unlike the illustration in FIG. 5A, referring to FIG. 5B, the time for which a decoding module 532 operates may be short. The decoding module 532 of the inventive concept may determine decoding information to be stored in a cache device, on the basis of the number of errors included in read data. When the number of errors included in the read data increases, a decoding latency may increase, and thus, the time taken for the decoding process may increase. Therefore, by storing data having a long decoding latency in the cache device, data, which takes a long time to correct an error in the decoding process, may be returned at a high speed, and thus, the time taken for the entire decoding process may be reduced.

A memory system according to at least one embodiment of the inventive concept includes a system controller and a memory device. The system controller is electrically connected to a host device. The memory device is configured to transmit data corresponding to an address to the system controller, on the basis of the address and a data read command received from the system controller. The system controller includes a memory controller and a decoding module. The memory controller is configured to receive the address from the host device, transmit the received address to the decoding module, and return, to the host device, decoded data received from the decoding module. The decoding module including a cache device and a decoder. The decoding module is configured to receive the data corresponding to the address from the memory device. The decoding module is configured to determine whether or not the data corresponding to the address is stored in the cache device. In response to determining that the data corresponding to the address is stored in the cache device, the decoding module is configured to transmit the data stored in the cache device to the memory controller. In response to determining that the data corresponding to the address is not stored in the cache device, the decoding module is configured to use the decoder to decode the data corresponding to the address received from the memory device for generating a decoded result, store the decoded result in the cache device, and transmit the decoded results (e.g., decoded data) to the memory controller.

According to at least one embodiment of the inventive concept, a decoding module generates, by using the decoder, decoding information including the number of errors included in the data corresponding to the address and the decoded data in which an error is corrected; determines that a free space is present in the cache device, in response to determining that the free space is present in the cache device; stores, in the cache device, the decoding information of the data corresponding to the address; and in response to determining that the free space is not present in the cache device; evicts decoding information of data including a minimum number of errors from among a plurality of pieces of decoding information stored in the cache device; and stores, in the cache device, the decoding information of the data corresponding to the address.

According to at least one embodiment of the inventive concept, in response to checking that the number of errors included in data is greater than a determined number, the decoding module stores decoding information of the data in the cache device.

According to at least one embodiment of the inventive concept, the decoding module determines a position of an error included in the data corresponding to the address by using the decoder; generates an error vector indicating the position of the error included in the data; and stores, in the cache device, decoding information including the number of errors included in the data corresponding to the address, and the error vector.

According to at least one embodiment of the inventive concept, the decoding module encodes the error vector according to a preset algorithm to generate an encoded error vector and stores decoding information including the encoded error vector in the cache device.

According to at least one embodiment of the inventive concept, in response to receiving, from the memory controller, an address corresponding to decoding information stored in the cache device; the decoding module generates decoded data by using erasure decoding based on an error vector included in the decoding information.

According to at least one embodiment of the inventive concept, the decoding module determines the number of errors included in the decoded data by performing a syndrome check after generating the decoded data and compares the number of errors included in the decoding information with the number of errors determined via the syndrome check.

According to at least one embodiment of the inventive concept, the decoding module transmits the decoded data to the memory controller, in response to determining that the number of errors included in the decoding information is the same as the number of errors determined via the syndrome check; and in response to determining that the number of errors included in the decoding information is different from the number of errors determined via the syndrome check, acquires data corresponding to the address from the memory device and decodes the acquired data.

According to at least one embodiment of the inventive concept, the data corresponding to the address, which is received by the decoding module from the memory device, includes a message bit and a parity bit, and the decoding module may detect a number and positions of errors included in the message bit based on the parity bit.

According to at least one embodiment of the inventive concept, a decoding module including a cache device and a decoder determines whether or not data corresponding to an address received from a memory controller is stored in the cache device; in response to determining that the data corresponding to the address is stored in the cache device, transmits the data stored in the cache device to the memory controller; in response to determining that the data corresponding to the address is not stored in the cache device, receives the data corresponding to the address by transmitting the address to the memory device; decodes the data corresponding to the address by using the decoder to generate a decoded result; stores the decoded result in the cache device, and transmits the decoded result (e.g., decoded data) to the memory controller.

According to at least one embodiment of the inventive concept, the decoding module generates, by using the decoder, decoding information including a number of errors included in the data corresponding to the address and the decoded data in which an error is corrected; determines that a free space is present in the cache device, in response to determining that the free space is present in the cache device; stores, in the cache device, decoding information of the data corresponding to the address; and in response to determining that the free space is not present in the cache device, evicts decoding information of data including a minimum number of errors from among a plurality of pieces of decoding information stored in the cache device; and stores, in the cache device, the decoding information of the data corresponding to the address.

According to at least one embodiment of the inventive concept, in response to determining that the number of errors included in data is greater than a preset number, the decoding module stores decoding information of the data in the cache device.

According to at least one embodiment of the inventive concept, the decoding module determines a position of an error included in data corresponding to the address by using the decoder; generates an error vector indicating the position of the error included in the data; and stores, in the cache device, decoding information including the number of errors included in the data corresponding to the address, and the error vector.

According to at least one embodiment of the inventive concept, the decoding module encodes the error vector according to a preset algorithm to generate an encoded error vector and stores decoding information including the encoded error vector in the cache device.

According to at least one embodiment of the inventive concept, in response to receiving, from the memory controller, an address corresponding to decoding information stored in the cache device, the decoding module generates decoded data by using erasure decoding based on the error vector included in the decoding information.

According to at least one embodiment of the inventive concept, the decoding module determines the number of errors included in the decoded data by performing a syndrome check after generating the decoded data and compares the number of errors included in the decoding information with the number of errors determined via the syndrome check.

According to at least one embodiment of the inventive concept, the decoding module transmits the decoded data to the memory controller, in response to determining that the number of errors included in the decoding information is the same as the number of errors determined via the syndrome check; and in response to determining that the number of errors included in the decoding information is different from the number of errors determined via the syndrome check, acquires data corresponding to the address from the memory device and decodes the acquired data.

According to at least one embodiment of the inventive concept, the data corresponding to the address, which is received by the decoding module from the memory device, includes a message bit and a parity bit, and the decoding module may detect the number and positions of errors included in the message bit based on the parity bit.

Figure 6A:
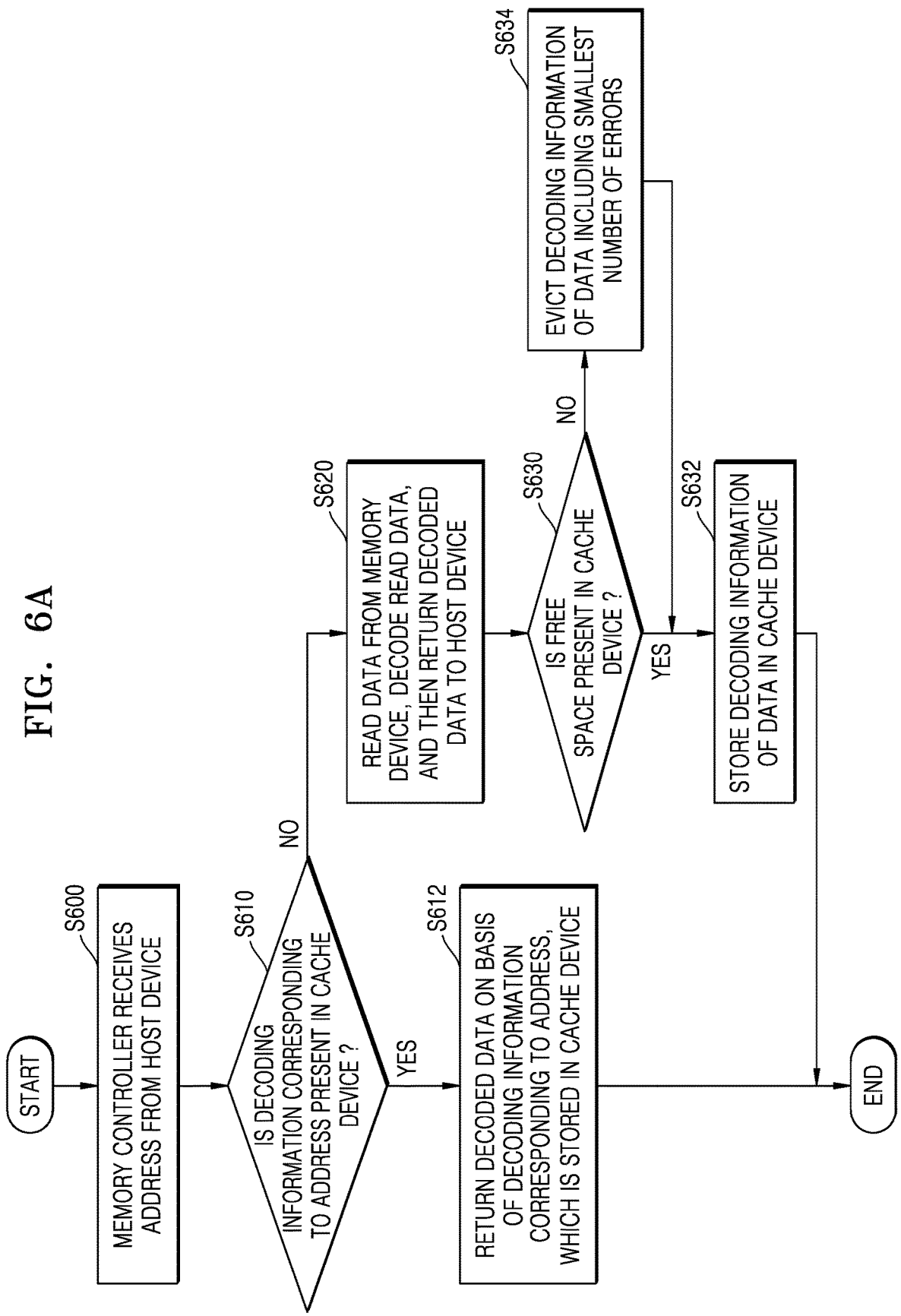
FIGS. 6A and 6B are flowcharts illustrating a method by which a memory system caches data on the basis of a decoding latency, according to an embodiment.
Figure 6B:
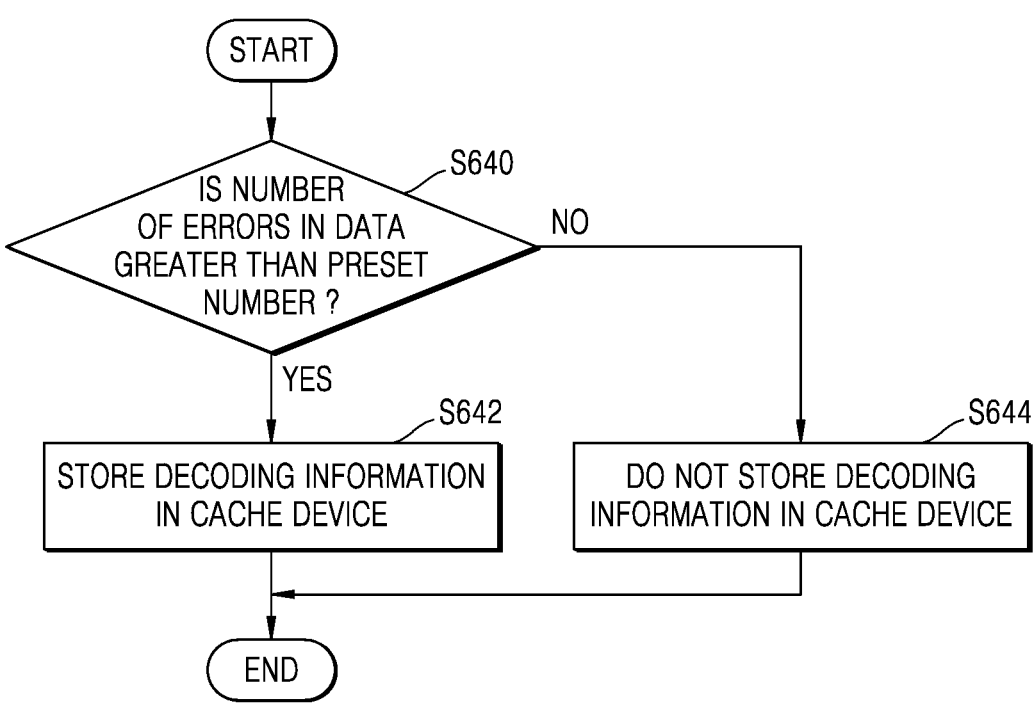

FIGS. 6A and 6B are flowcharts of a method by which a memory system caches data on the basis of a decoding latency, according to an embodiment.

Referring to FIG. 6A, in operation S600, a memory controller receives an address from a host device. The memory controller (e.g., 224) may receive a signal for which a protocol is identified, via a host interface (e.g., 222) included in a system controller. The memory controller may transmit the received address to a decoding module (e.g., 226).

In operation S610, the decoding module may determine whether or not decoding information corresponding to the address is present in a cache device (e.g., 322). In response to determining that the decoding information corresponding to the address is present in the cache device, in operation S612, the decoding module may return decoded data to the host device, on the basis of the decoding information corresponding to the address, which is stored in the cache device. For example, the decoding module may generate the decoded data using the decoding information. In response to determining that the decoding information corresponding to the address is not present in the cache device, in operation S620, the decoding module reads data from a memory device stored at the address, decodes the read data to generate decoded data, and then returns the decoded data to the host device.

In operation S630, the decoding module determines whether or not a free space is present in the cache device. In response to determining that the free space is present in the cache device, in operation S632, the decoding module stores the decoding information of the data in the cache device. In response to determining that the free space is not present in the cache device, in operation S634, the decoding module evicts decoding information of data including the smallest number of errors from among the decoding information stored in the cache device. After evicting the decoding information, the decoding module may store new decoding information in the cache device. For example, if first decoding information of first data indicates the first data has 4 errors, the evicting could evict second decoding information of data having 3 errors, and then store the first decoding information.

FIG. 6B is a flowchart of a method by which a decoding module stores decoding information in a cache device on the basis of the number of errors included in read data.

In operation S640, a decoding module determines whether or not the number of errors in data corresponding to decoding information to be currently stored in a cache device is greater than a preset number. When the number of errors included in the data is greater than the preset number, in operation S642, the decoding module stores the decoding information in the cache device. In operation S644, the decoding module does not store, in the cache device, the decoding information of data including a number of errors less than the preset number. Even when data including a small number of errors is decoded from a memory device, a decoding latency is not long, and thus, the decoding module may select decoding information to be stored in the cache device, on the basis of the number of errors to secure a space in which decoding information of another data having a long decoding latency is to be stored in the cache device.

A method by which a memory system performs cache management on the basis of a decoding latency, according to at least one embodiment of the inventive concept, includes transmitting, to a decoding module by a system controller, an address received from a host device; determining whether or not data corresponding to the address is stored in a cache device included in the decoding module; in response to determining that the data corresponding to the address is stored in the cache device, transmitting the data stored in the cache device to the memory controller; in response to determining the data corresponding to the address is not stored in the cache device, decoding the data corresponding to the address, which is received from the memory device, by using a decoder to generate a decoded result; storing the decoded result in the cache device, and transmitting the decoded result (e.g., decoded data) to the memory controller.

According to at least one embodiment of the inventive concept, a caching method includes: generating, by using the decoder, decoding information including the number of errors included in the data corresponding to the address and the decoded data in which an error is corrected; determining that a free space is present in the cache device; in response to determining that the free space is present in the cache device, storing, in the cache device, decoding information of the data corresponding to the address; and in response to determining that the free space is not present in the cache device, evicting decoding information of data including a minimum number of errors from among a plurality of pieces of decoding information stored in the cache device; and storing, in the cache device, decoding information of data corresponding to the address.

Figure 7A:
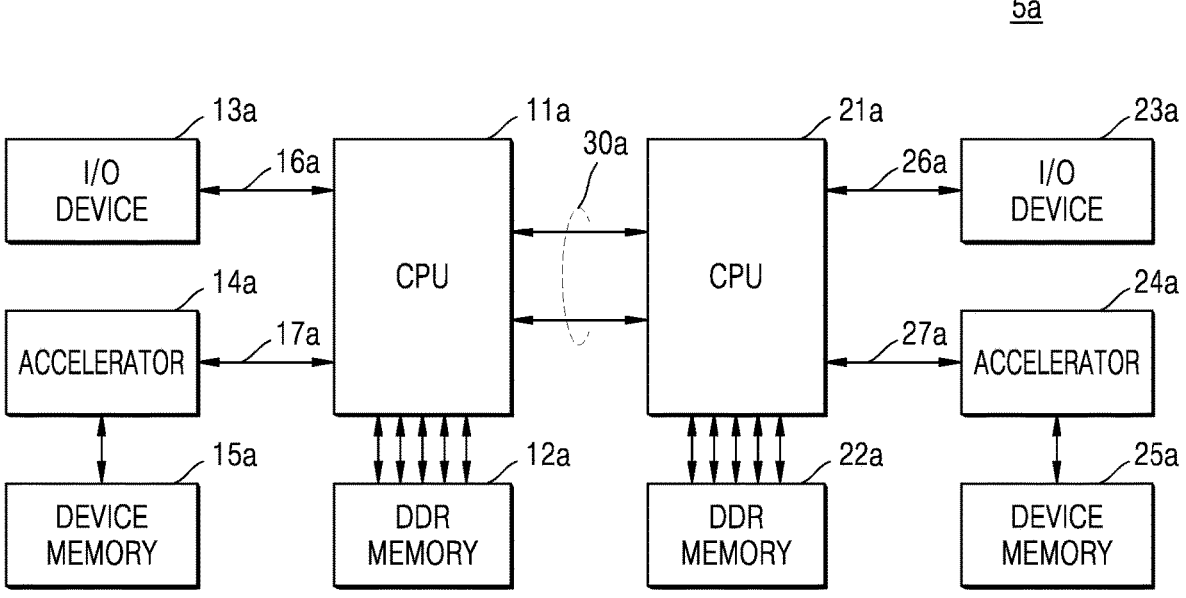
FIGS. 7A and 7B are block diagrams illustrating examples of a system according to embodiments.
Figure 7B:
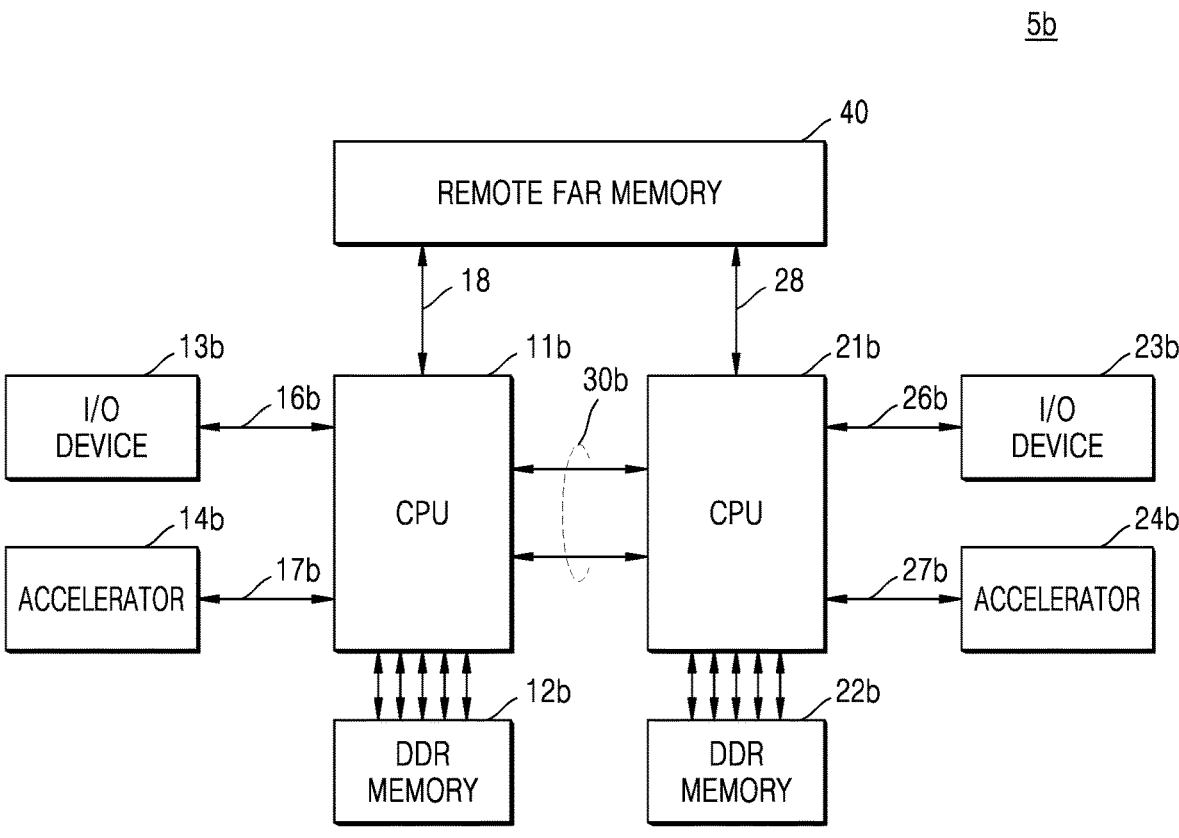

FIGS. 7A and 7B are block diagrams illustrating examples of a system according to embodiments. In detail, the block diagrams of FIGS. 7A and 7B illustrate systems 5a and 5b each including a plurality of CPUs. Hereinafter, the same descriptions of FIGS. 7A and 7B as each other are omitted.

Referring to FIG. 7A, the system 5a may include first and second CPUs 11a and 21a and may include first and second double data rate (DDR) memories 12a and 22a connected to the first and second CPUs 11a and 21a, respectively. The first and second CPUs 11a and 21a may be connected to each other via an interconnection system 30a based on processor interconnection technology. As illustrated in FIG. 7A, the interconnection system 30a may provide at least one CPU-to-CPU coherent link.

The system 5a may include a first I/O device 13a and a first accelerator 14a communicating with the first CPU 11a and may include a first device memory 15a connected to the first accelerator 14a. The first CPU 11a and the first I/O device 13a may communicate with each other through a bus 16a. The first CPU 11a and the first accelerator 14a may communicate with each other through a bus 17a. In addition, the system 5a may include a second I/O device 23a and a second accelerator 24a communicating with the second CPU 21a and may include a second device memory 25a connected to the second accelerator 24a. The second CPU 21a and the second I/O device 23a may communicate with each other through a bus 26a. The second CPU 21a and the second accelerator 24a may communicate with each other through a bus 27a. The first CPU 11a or the second CPU 21a may include any of the above-described decoding modules (e.g., 226, 320, or 420).

Communication based on a protocol may be performed through the buses 16a, 17a, 26a, and 27a, and the protocol may support the selective and parallel error correction operation described above with reference to the drawings. Accordingly, the latency taken for error correction operations may be reduced for memories, e.g., the first device memory 15a, the second device memory 25a, the first DDR memory 12a, and/or the second DDR memory 22a, and the performance of the system 5a may be increased.

Similar to the system 5a in FIG. 7A, referring to FIG. 7B, the system 5b may include first and second CPUs 11b and 21b, first and second DDR memories 12b and 22b, first and second I/O devices 13b and 23b, and first and second accelerators 14b and 24b and may further include a remote far memory 40. The first and second CPUs 11b and 21b may communicate with each other via an interconnection system 30b. The first CPU 11b may be connected to the first I/O device 13b through bus 16b and connected to the first accelerator 14b through bus 17b. The second CPU 21b may be connected to the second I/O device 23b through bus 26b and connected to the second accelerator 24b through bus 27b.

The first CPU 11b may be connected to the remote far memory 40 through the first bus 18 and the second CPU 21b may be connected to the remote far memory 40 through the second bus 28. The remote far memory 40 may be used for expansion of memory in the system 5b, and the first and second buses 18 and 28 may be used as memory expansion ports. Protocols corresponding to the first and second buses 18 and 28 as well as the buses 16b, 17b, 26b, and 27b may also support the selective and parallel error correction operations described above with reference to the drawings. Accordingly, the latency taken for error correction may be reduced for the remote far memory 40, and the performance of the system 5b may be increased. The first CPU 11b or the second CPU 21b may include any of the above-described decoding modules (e.g., 226, 320, or 420).

Figure 8:
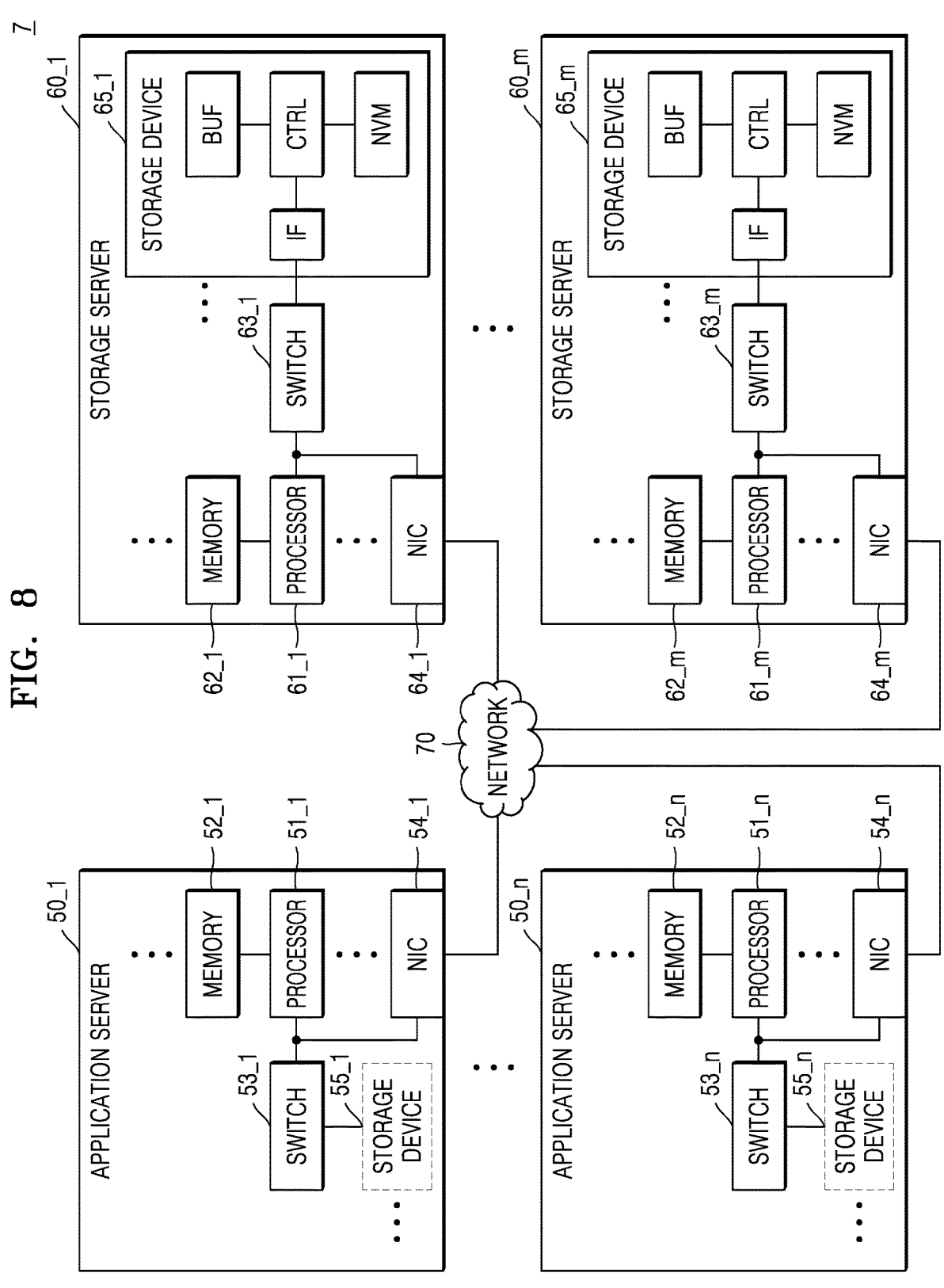
FIG. 8 is a block diagram illustrating a data center including a system, according to an embodiment.

FIG. 8 is a block diagram illustrating a data center 7 including a system, according to an embodiment. In some embodiments, a system as described above with reference to the drawings may be included in the data center 7 as an application server and/or a storage server.

Referring to FIG. 8, the data center 7 may collect various types of data and provide a service and may be referred to as a data storage center. For example, the data center 7 may be a system for operating a search engine and a database, or may be a computing system used by an enterprise such as a bank or a government agency. As illustrated in FIG. 8, the data center 7 may include application servers 50_1 to 50_*n* and storage servers 60_1 to 60_*m* (wherein m and n are each an integer greater than 1). The number n of application servers 50_1 to 50_*n* and the number m of storage servers 60_1 to 60_*m* may be variously selected according to embodiments, and the number n of application servers 50_1 to 50_*n* may be different from the number m of storage servers 60_1 to 60_*m*.

The application server 50_1 or 50_*n* may include at least one of a processor 51_1 or 51_*n*, a memory 52_1 or 52_*n*, a switch 53_1 or 53_*n* (e.g., switching circuits, multiplexers, etc.), a network interface controller (NIC) 54_1 or 54_*n* (e.g., controller circuits), and a storage device 55_1 or 55_*n*. The processor 51_1 or 51_*n* may control the overall operation of the application server 50_1 or 50_*n* and may execute instructions and/or data loaded into the memory 52_1 or 52_*n* by accessing the memory 52_1 or 52_*n*. As a non-limiting example, the memory 52_1 or 52_*n* may include double data rate synchronous DRAM (DDR SDRAM), high bandwidth memory (HBM), a hybrid memory cube (HMC), a dual in-line memory module (DIMM), an Optane DIMM, or a non-volatile DIMM (NVM-DIMM). According to embodiments, the number of processors and the number of memories included in the application server 50_1 or 50_*n* may be variously selected. In some embodiments, the processor 51_1 or 51_*n* and the memory 52_1 or 52_*n* may provide a processor-memory pair. In some embodiments, the number of processors 51_1 to 51_*n* and the number of memories 52_1 to 52_*n* may be different from each other. The processor 51_1 or 51_*n* may include a single-core processor or a multi-core processor. In some embodiments, as illustrated by the dashed line in FIG. 8, the storage device 55_1 or 55_*n* may be omitted from the application server 50_1 or 50_*n*. The number of storage devices 55_1 to 55_*n* included in the application servers 50_1 to 50_*n* may be variously selected according to embodiments. The processor 51_1 or 51_*n*, the memory 52_1 or 52_*n*, the switch 53_1 or 53_*n*, the NIC 54_1 or 54_*n*, and/or the storage device 55_1 or 55_*n* may communicate with one another through a link as described above with reference to the drawings.

The storage server 60_1 or 60_*m* may include at least one of a processor 61_1 or 61_*m*, a memory 62_1 or 62_*m*, a switch 63_1 or 63_*m* (e.g., switching circuits, multiplexers, etc.), an NIC 64_1 or 64_*m* (e.g., controller circuits), and a storage device 65_1 or 65_*m*. The processor 61_1 or 61_*m* and the memory 62_1 or 62_*m* may operate similar to the processor 51_1 or 51_*n* and the memory 52_1 or 52_*n* of the application server 50_1 or 50_*n* described above.

The application servers 50_1 to 50_*n* and the storage servers 60_1 to 60_*m* may communicate with one another via a network 70. In some embodiments, the network 70 may be implemented by using a fibre channel (FC), Ethernet, or the like. The FC may be a medium used for relatively high-speed data transmission, and an optical switch providing high performance/high availability may be used. The storage servers 60_1 to 60_*m* may be provided as file storages, block storages, or object storages according to an access method of the network 70.

In some embodiments, the network 70 may be a storage-only network such as a storage area network (SAN). For example, the SAN may be an FC-SAN that may use an FC network and is implemented according to an FC protocol (FCP). Alternatively, the SAN may be an IP-SAN that uses a TCP/IP network and is implemented according to an SCSI over TCP/IP or Internet SCSI (iSCSI) protocol. In some embodiments, the network 70 may be a general network such as a TCP/IP network. For example, the network 70 may be implemented according to a protocol such as FC over Ethernet (FCoE), a network attached storage (NAS), or NVMe over fabrics (NVMe-oF).

Hereinafter, the application server 50_1 and the storage server 60_1 are mainly described, but the description of the application server 50_1 may also be applied to another application server (e.g., the application server 50_*n*), and the description of the storage server 60_1 may be applied to another storage server (e.g., the storage server 60_*m*).

The application server 50_1 may store, in one of the storage servers 60_1 to 60_*m* via the network 70, data requested by a user or client to be stored. In addition, the application server 50_1 may acquire, from one of the storage servers 60_1 to 60_*m* via the network 70, data requested by the user or client to be read. For example, the application server 50_1 may be implemented as a web server or a database management system (DBMS).

The application server 50_1 may access the memory 52_*n* and/or the storage device 55_*n* included in another application server 50_*n* via the network 70, and/or may access the memories 62_1 to 62_*m* and/or the storage devices 65_1 to 65_*m* included in the storage servers 60_1 to 60_*m* via the network 70. Accordingly, the application server 50_1 may perform various operations on data stored in the application servers 50_1 to 50_*n* and/or the storage servers 60_1 to 60_*m*. For example, the application server 50_1 may execute a command to move or copy data between the application servers 50_1 to 50_*n* and/or the storage servers 60_1 to 60_*m*. Here, the data may be moved, via the memories 62_1 to 62_*m* of the storage servers 60_1 to 60_*m* or directly, from the storage devices 65_1 to 65_*m* of the storage servers 60_1 to 60_*m* to the memories 52_1 to 52_*n* of the application servers 50_1 to 50_*n*. In some embodiments, the data moving via the network 70 may be data encrypted for security or privacy.

In the storage server 60_1, an interface IF may provide a physical connection between the processor 61_1 and a controller CTRL and a physical connection between the NIC 64_1 and the controller CTRL. For example, the interface IF may be implemented in a direct attached storage (DAS) method that directly connects the storage device (65_1) with a dedicated cable. In addition, for example, the interface IF may be implemented in various interface methods, such as advanced technology attachment (ATA), serial ATA (SATA), external SATA (e-SATA), a small computer small interface (SCSI), a serial attached SCSI (SAS), peripheral component interconnection (PCI), PCI express (PCIe), NVM express (NVMe), IEEE 1394, a USB, a secure digital (SD) card, a multi-media card (MMC), an embedded multi-media card (eMMC), a universal flash storage (UFS), an embedded universal flash storage (eUFS), and a compact flash (CF) card interface.

In the storage server 60_1, under control of the processor 61_1, the switch 63_1 may selectively connect the processor 61_1 and the storage device 65_1 to each other, or may selectively connect the NIC 64_1 and the storage device 65_1 to each other.

In some embodiments, the NIC 64_1 may include a network interface card, a network adapter, or the like. The NIC 54_1 may be connected to the network 70 via a wired interface, a wireless interface, a Bluetooth interface, an optical interface, or the like. The NIC 54_1 may include an internal memory, a DSP, a host bus interface, and the like, and may be connected to the processor 61_1 and/or the switch 63_1 via a host bus interface. In some embodiments, the NIC 64_1 may be integrated with at least one of the processor 61_1, the switch 63_1, and the storage device 65_1.

In the application servers 50_1 to 50_*n* or the storage servers 60_1 to 60_*m*, the processors 51_1 to 51_*n* or the processors 61_1 to 61_*m* may program or read data by transmitting commands to the storage devices 55_1 to 55_*n* or the storage devices 65_1 to 65_*m*, or the memories 52_1 to 52_*n* or the memories 62_1 to 62_*m*. Here, the data may data in which an error is corrected via an ECC engine. The data may be data that is processed by data bus inversion (DBI) or data masking (DM), and may include cyclic redundancy code (CRC) information. The data may be data encrypted for security or privacy.

The storage devices 55_1 to 55_*n* and 65_1 to 65_*m* may transmit control signals and command/address signals to non-volatile memory devices (e.g., NAND flash memory devices (NVMs)), in response to read commands received from the processors 51_1 to 51_*n* and 61_1 to 61_*m*. Accordingly, when reading data from an NVM, a read enable signal may be input as a data output control signal and may operate to output data to a DQ bus. A data strobe signal may be generated by using the read enable signal. A command and/the address signal may be latched according to a rising edge or a falling edge of a write enable signal.

The controller CTRL (e.g., a controller circuit) may control the overall operation of the storage device 65_1. In an embodiment, the controller CTRL may include static random access memory (SRAM). The controller CTRL may write data to an NVM in response to a write command, or may read data from the NVM in response to a read command. For example, the write command and/or the read command may be generated on the basis of a request provided from a host, e.g., from the processor 61_1 in the storage server 60_1, the processor 61_*m* in another storage server 60_*m*, or the processor 51_1 or 51_*n* in the application server 50_1 or 50_*n*. A buffer BUF (e.g., a buffer circuit) may temporarily store (buffer) data to be written to the NVM or data read from the NVM. In some embodiments, the buffer BUF may include DRAM. In addition, the buffer BUF may store metadata, and the metadata may refer to user data or data generated by the controller CTRL to manage the NVM. The storage device 65_1 may include a secure element (SE) for security or privacy.

Any one of the processors 51_1 to 51_*n* or the processors 61_1 to 61_*m* may include any of the above-identified decoding modules (e.g., 226, 320, or 420).

While the inventive concept has been particularly shown and described with reference to embodiments thereof, it will be understood that various changes in form and details may be made therein without departing from the spirit and scope of the disclosure.

What is claimed is:
1. A memory system comprising:
a system controller configured to communicate with a host device; and
a memory device configured to transmit data corresponding to an address to the system controller, on the basis of the address and a data read command received from the system controller,
wherein the system controller comprises:
a memory controller configured to receive the address from the host device, and output to the host device, decoded data received from a decoding module; and
the decoding module including a cache device and a decoder, wherein the decoding module is configured to receive the data corresponding to the address from the memory device, and
wherein the decoding module is configured to determine whether or not the decoded data corresponding to the address is stored in the cache device,
transmit the decoded data stored in the cache device to the memory controller in response to determining that the decoded data corresponding to the address is stored in the cache device,
decode the data corresponding to the address received from the memory device using the decoder to generate the decoded data, store the decoded data in the cache device, and transmit the decoded data to the memory controller in response to determining that the decoded data corresponding to the address is not stored in the cache device; and
store, in the cache device, decoding information of data having a long decoding latency and evict decoding information of data having a short decoding latency.

2. The memory system of claim 1, wherein the decoding module is further configured to:
generate, by using the decoder, decoding information indicating a number of errors included in the data corresponding to the address and the decoded data in which an error is corrected;
store, in the cache device, the decoding information of the data corresponding to the address in response to determining that a free space is present in the cache device; and
evict decoding information of data including a minimum number of errors from among a plurality of pieces of decoding information stored in the cache device, and store, in the cache device, the decoding information of the data corresponding to the address in response to determining that the free space is not present in the cache device.

3. The memory system of claim 1, wherein the decoding module is further configured to store the decoding information of the data in the cache device, in response to determining that a number of errors included in the data is greater than a preset number.

4. The memory system of claim 1, wherein the decoding module is further configured to determine a position of an error included in the data corresponding to the address by using the decoder, generate an error vector indicating the position of the error included in the data, and store, in the cache device, the decoding information including a number of errors included in the data corresponding to the address, and the error vector.

5. The memory system of claim 4, wherein the decoding module is further configured to encode the error vector according to a preset algorithm and store the decoding information including the encoded error vector in the cache device.

6. The memory system of claim 1, wherein the decoding module is further configured to, in response to receiving, from the memory controller, an address corresponding to the decoding information stored in the cache device, generate the decoded data by using erasure decoding based on an error vector included in the decoding information.

7. The memory system of claim 6, wherein the decoding module is further configured to:
determine a number of errors included in the decoded data by performing a syndrome check after generating the decoded data; and compare the number of errors included in the decoding information with the number of errors determined via the syndrome check.

8. The memory system of claim 7, wherein the decoding module is further configured to:

transmit the decoded data to the memory controller in response to determining that the number of errors included in the decoding information is the same as the number of errors determined via the syndrome check; and acquire data corresponding to the address from the memory device and decode the acquired data in response to determining that the number of errors included in the decoding information is different from the number of errors determined via the syndrome check.

9. The memory system of claim 1, wherein the data corresponding to the address received by the decoding module from the memory device, includes a message bit and a parity bit, and the decoding module is configured to detect a number and positions of errors included in the message bit based on the parity bit.

10. A decoding module comprising:

a cache device; and a decoder configured to:

determine whether or not decoded data corresponding to an address received from a memory controller is stored in the cache device;

transmit the decoded data stored in the cache device to the memory controller in response to determining that the decoded data corresponding to the address is stored in the cache device; and receive the data corresponding to the address from a memory device, decode the data corresponding to the address by using the decoder to generate decoded data, store the decoded data in the cache device, and transmit the decoded data to the memory controller in response to determining that the decoded data corresponding to the address is not stored in the cache device, and wherein the decoding module is configured to:

store, in the cache device, decoding information of data having a long decoding latency and evict decoding information of data having a short decoding latency.

11. The decoding module of claim 10, wherein the decoding module is further configured to:

generate, by using the decoder, decoding information including a number of errors included in the data corresponding to the address and the decoded data in which an error is corrected;

store, in the cache device, the decoding information of the data corresponding to the address in response to determining that a free space is present in the cache device; and evict decoding information of data including a minimum number of errors from among a plurality of pieces of the decoding information stored in the cache device, and store, in the cache device, the decoding information of the data corresponding to the address in response to determining that the free space is not present in the cache device.

12. The decoding module of claim 10, wherein the decoding module is further configured to store the decoding information of the data in the cache device in response to determining that a number of errors included in data is greater than a preset number.

13. The decoding module of claim 10, wherein the decoding module is further configured to:

determine a position of an error included in the data corresponding to the address by using the decoder;

generate an error vector indicating the position of the error included in the data; and store, in the cache device, decoding information including a number of errors included in the data corresponding to the address, and the error vector.

14. The decoding module of claim 13, wherein the decoding module is further configured to encode the error vector according to a preset algorithm and store the decoding information including the encoded error vector in the cache device.

15. The decoding module of claim 13, wherein the decoding module is further configured to generate the decoded data by using erasure decoding based on the error vector included in the decoding information in response to receiving, from the memory controller, an address corresponding to the decoding information stored in the cache device.

16. The decoding module of claim 10, wherein the decoding module is further configured to:

determine a number of errors included in the decoded data by performing a syndrome check after generating the decoded data; and compare the number of errors included in the decoding information with the number of errors determined via the syndrome check.

17. The decoding module of claim 16, wherein the decoding module is further configured to:

transmit the decoded data to the memory controller in response to determining that the number of errors included in the decoding information is the same as the number of errors determined via the syndrome check; and acquire data corresponding to the address from the memory device and decode the acquired data in response to determining that the number of errors included in the decoding information is different from the number of errors determined via the syndrome check.

18. The decoding module of claim 10, wherein the data corresponding to the address, which is received by the decoding module from the memory device, includes a message bit and a parity bit, and the decoding module is configured to detect a number and positions of errors included in the message bit based on the parity bit.

19. A method for performing cache management in a memory system, the method comprising:

receiving, by a decoding module, an address from a host device;

determining, by the decoding module, whether or not decoded data corresponding to the address is stored in a cache device included in the decoding module;

transmitting, by the decoding module, the decoded data stored in the cache device to a memory controller in response to determining that the decoded data corresponding to the address is stored in the cache device; and the decoding module decoding the data corresponding to the address received from the memory device by using a decoder to generate decoded data, storing the decoded data in the cache device, and transmitting the decoded data to the memory controller in response to determining the decoded data corresponding to the address is not stored in the cache device, wherein the method further comprises:

storing, in the cache device, decoding information of data having a long decoding latency and evict decoding information of data having a short decoding latency.

20. The method of claim 19, further comprising:

generating, by using the decoder, decoding information indicating a number of errors included in the data corresponding to the address and including the decoded data in which an error is corrected;

decoding information of the data corresponding to the address in response to determining that a free space is present in the cache device, storing, in the cache device; and evicting decoding information of data including a minimum number of errors from among a plurality of pieces of the decoding information stored in the cache device, and storing, in the cache device, the decoding information of the data corresponding to the address in response to determining that the free space is not present in the cache device.

* * * * *